United States Patent
Sivasubramanian et al.

(10) Patent No.: US 9,751,987 B2
(45) Date of Patent: Sep. 5, 2017

(54) CATALYST FOR SYNTHESIS OF SILOXANES

(71) Applicant: Momentive Performance Materials Inc., Waterford, NY (US)

(72) Inventors: Karthikeyan Sivasubramanian, Bangalore (IN); Patricia Pike Anderson, Williamstown, MA (US); Vivek Khare, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 14/913,789

(22) PCT Filed: Aug. 18, 2014

(86) PCT No.: PCT/US2014/051414
§ 371 (c)(1),
(2) Date: Feb. 23, 2016

(87) PCT Pub. No.: WO2015/026691
PCT Pub. Date: Feb. 26, 2015

(65) Prior Publication Data
US 2016/0355643 A1    Dec. 8, 2016

Related U.S. Application Data

(60) Provisional application No. 61/869,218, filed on Aug. 23, 2013.

(51) Int. Cl.
*C08G 77/08* (2006.01)
*C08G 77/04* (2006.01)

(52) U.S. Cl.
CPC ............ *C08G 77/08* (2013.01); *C08G 77/04* (2013.01); *B01J 2231/14* (2013.01)

(58) Field of Classification Search
None
See application file for complete search history.

(56) References Cited

U.S. PATENT DOCUMENTS

| | | | | |
|---|---|---|---|---|
| 3,842,019 A | * | 10/1974 | Kropp | C08F 4/00 430/287.1 |
| 4,247,674 A | | 1/1981 | Koshar et al. | |
| 4,387,222 A | * | 6/1983 | Koshar | C07D 285/01 526/146 |
| 4,429,093 A | * | 1/1984 | Koshar | C07D 285/01 526/205 |
| 5,504,234 A | | 4/1996 | Omura et al. | |
| 5,696,219 A | | 12/1997 | Jallouli et al. | |
| 5,883,215 A | | 3/1999 | Bischoff et al. | |
| 6,244,962 B1 | | 6/2001 | Bacher et al. | |
| 6,258,968 B1 | | 7/2001 | Eversheim et al. | |
| 2006/0155089 A1 | | 7/2006 | Ferenz et al. | |
| 2008/0097064 A1 | | 4/2008 | Blanc-Magnard et al. | |

OTHER PUBLICATIONS

Tang et al. "The search for tolerant Lewis acid catalysts. Part 2: Enantiopure cycloalkyldialkylsilyl triflimide catalysts" Tetrahedron, 63(35), 2007, 8449-8462.*
Desmurs et al. "Bis(trifluoromethane)sulfonimide initiated ring-opening polymerization of octamethylcyclotetrasiloxane" Journal of Organometallic Chemistry, 646, 2002, 171-178.*
Kakuchi R. et al "Controlled/Living Ring-Opening Ploymerization of delta-Valerolactone Using Triflylimide as an Efficient Cationic Organocatalyst." Macromolecules. vol. 43. 2010. pp. 7090-7094.
Patent Cooperation Treaty (PCT), International Search Report and Written Opinion for Application PCT/US2014/51414 filed Aug. 18, 2014, mailed Nov. 28, 2014 International Searching Authority, US.

* cited by examiner

Primary Examiner — Robert S Loewe
(74) Attorney, Agent, or Firm — James Abruzzo; McDonald Hopkins LLC

(57) ABSTRACT

The present technology provides compositions, methods, and processes to form polysiloxanes. In one aspect, the present technology provides a process for the ring opening polymerization of a cyclosiloxane comprising contacting a cyclosiloxane with a N-trialkylsilyl-bis(perfluoroalkylsulfonyl)imide compound.

17 Claims, No Drawings

CATALYST FOR SYNTHESIS OF SILOXANES

CROSS REFERENCE TO RELATED APPLICATIONS

This application claims priority to and the benefit of International Application No. PCT/US2014/051414 entitled "Catalyst for Synthesis of Siloxanes," filed on Aug. 18, 2014, which claims priority to and the benefit of U.S. Provisional Application No. 61/869,218, entitled "Catalyst for Synthesis of Siloxanes," filed Aug. 23, 2013, the disclosure of each of which is incorporated herein by reference in its entirety.

FIELD

The present technology relates to processes of forming siloxanes using an acid catalyst. In particular, the present technology provides a new acid material that may be used in ring opening polymerization reactions.

BACKGROUND

Cyclosiloxanes are often used as starting monomers to form polysiloxanes. Generally polysiloxanes may be formed by the ring opening polymerization of cyclosiloxanes and a suitable end-capping unit. The reaction is carried out in the presence of a catalyst.

Various catalysts are known for the polymerization of cyclosiloxanes. Examples are alkali metal hydroxides, alkali metal alkoxides or complexes of alkali metal hydroxides and an alcohol, alkali metal silanolates, and phosphonitrile halides (sometimes referred to as acidic phosphazenes). Such polymerizations may be carried out in bulk, in solvents (such as non-polar or polar organic solvents) or in emulsion. An endblocking agent may be used to regulate the molecular weight of the polymer and/or to add functionality. Polymerization may be terminated by using a neutralizing agent which reacts with the catalyst to render it non-active. In most cases catalyst residues remain in the polymer product and are desirably removed, such as by filtration.

Solid type catalysts may be used as a catalyst to synthesize polydimethylsiloxane (PDMS) fluids and PDMS functional fluids by ring opening polymerization. Solid type catalysts exhibit high catalytic activity, but generate solid waste. The solid waste is typically incinerated. Additionally, the solid waste contains a significant fraction of the product, which decreases the overall yield and may increase production costs.

SUMMARY

The present technology provides compositions, methods, and processes to form polysiloxanes.

In one aspect, the present technology provides a process for the ring opening polymerization of a cyclosiloxane comprising contacting a cyclosiloxane with a N-trialkylsilyl-bis(perfluoroalkylsulfonyl)imide compound.

In one embodiment, the N-trialkylsilyl-bis(perfluoroalkylsulfonyl)imide is of the formula:

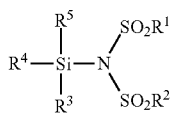

where $R^1$ and $R^2$ are independently chosen from a perfluoroalkyl radical; and $R^3$, $R^4$, and $R^5$ are independently chosen from a linear or branched alkyl optionally comprising one or more heteroatoms.

In one embodiment, the perfluoroalkyl radical is a linear or branched perfluoroalkyl radical having 1-10 carbon atoms. In one embodiment, the perfluoroalkyl radical is chosen from $-CF_3$, $-C_2F_5$, $-C_3F_7$, $-C_4F_9$, $-C_5F_{11}$, $-C_6F_{13}$, $-C_7F_{15}$, $-C_8F_{17}$ or a combination of two or more thereof. In one embodiment, the alkyl group is chosen from a linear or branched alkyl having 1-10 carbon atoms. In one embodiment, $R^1$ and $R^2$ are each $-CF_3$, and $R^3$-$R^5$ are each $CH_3$.

In one embodiment, the N-trialkylsilyl-bis(perfluoroalkylsulfonyl)imide is present in an amount of from about 0.025 weight percent to about 5 weight percent based on the total weight of the cyclosiloxane. In one embodiment, the N-trialkylsilyl-bis(perfluoroalkylsulfonyl)imide is present in an amount of from about 0.1 weight percent to about 0.4 weight percent based on the total weight of the cyclosiloxane.

In one embodiment, the cyclosiloxane is of the formula $(R^6R^7SiO)_n$, wherein $R^6$ and $R^7$ are independently chosen from hydrogen or an optionally substituted alkyl, alkenyl, aryl, alkaryl or aralkyl group having up to 8 carbon atoms, and n denotes an integer with a value of from 3 to 12.

In one embodiment, the cyclosiloxane is chosen from octamethyl cyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, decamethyl pentacyclosiloxane, cyclopenta (methylvinyl) siloxane, cyclotetra(phenylmethyl) siloxane, cyclopenta methylhydrosiloxane, or a combination of two or more thereof.

In one embodiment, the process comprises two or more cyclosiloxanes and/or silanol terminated poly(dimethylsiloxane), where at least two cyclosiloxanes have a different ring size from each other.

In one embodiment, the reaction comprises an endblocker material.

In one embodiment, the endblocker material is chosen from hexamethyldisiloxane; octamethyltrisiloxane; decamethyltetrasiloxane; dodecamethylpentasiloxane; tetradecamethylhexasiloxane; hexadecamethylheptasiloxane, hydride substituted siloxane or a combination of two or more thereof.

In one embodiment, the process further comprises deactivating the catalyst.

In one embodiment, deactivating the catalyst comprises treating the product with a material to neutralize the catalyst such as a base or a basic resin, or a combination of two or more thereof.

In one embodiment, the process further comprises filtering the reaction mixture.

These and other aspects of the present technology are further illustrated with respect to the following description.

DETAILED DESCRIPTION

Ring Opening Polymerization

The present technology provides, in one aspect, a process for the ring opening polymerization of cyclosiloxanes. The process comprises contacting a cyclosiloxane with a sulfonimide. The sulfonimide is suitable for catalyzing the ring-opening polymerization of cyclosiloxanes. The reaction may be carried out in a suitable solvent.

In one embodiment, the present technology provides a N-trialkylsilyl-bis(perfluoroalkylsulfonyl)imide compound as the catalyst. The N-trialkylsilyl-bis(perfluoroalkylsulfonyl)imide may be a compound of the Formula (1);

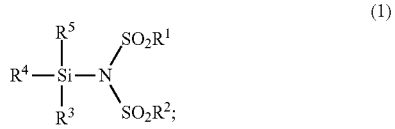

(1)

where $R^1$ and $R^2$ are independently chosen from a perfluoroalkyl radical; and $R^3$, $R^4$, and $R^5$ are independently chosen from, a linear or branched alkyl radical optionally comprising one or more heteroatoms.

The perfluoroalkyl radical may be a linear or branched perfluoroalkyl radical comprising 1-10 carbon atoms. Examples of suitable perfluoroalkyl radicals include, but are not limited to, —$CF_3$, —$C_2F_5$, —$C_3F_7$, —$C_4F_9$, —$C_5F_{11}$, —$C_6F_{13}$, —$C_7F_{15}$, —$C_8F_{17}$, etc. In one embodiment, both $R^1$ and $R^2$ may be the same linear or branched perfluoroalkyl radical. In one embodiment, both $R^1$ and $R^2$ may be $CF_3$. In one embodiment, $R^1$ and $R^2$ may be different linear or branched perfluoroalkyl radicals.

The linear or branched alkyl radicals may comprise 1-10 carbon atoms. Suitable alkyl radicals include, but are not limited to, methyl, ethyl, propyl, butyl, pentyl, hexyl, octyl, isopropyl, isobutyl, etc. In one embodiment, $R^2$, $R^4$, and $R^5$ may all be the same linear or branched alkyl radicals. In one embodiment, $R^2$, $R^4$, and $R^5$ may all be —$CH_3$. In one embodiment, two or more of $R^2$, $R^4$, and $R^5$ may be different linear or branched alkyl radicals. In one embodiment, $R^2$, $R^4$, and $R^5$ may all be different linear or branched alkyl radicals.

In one embodiment, the N-trialkylsilyl-bis(perfluoroalkylsulfonyl)imide compound is of the formula (2):

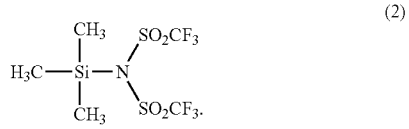

(2)

One or more different N-trialkylsilyl-bis(perfluoroalkylsulfonyl)imide compounds may be used as the catalyst material in the ring opening polymerization process.

The polymerization may be carried out in bulk or in the presence of a solvent. Suitable solvents may include, but are not limited to, liquid hydrocarbons or silicone fluids. The N-trialkylsilyl-bis(perfluoroalkylsulfonyl)imide catalyst may be diluted in a hydrocarbon solvent, such as hexane or heptane, or dispersed in a silicone fluid such as polydiorganosiloxane. When the N-trialkylsilyl-bis(perfluoroalkylsulfonyl)imide catalyst is initially in a solvent such as hexane, the hexane may be removed by evaporation under vacuum, and the catalyst may be dispersed in a silicone fluid to give a stable clear solution. The N-trialkylsilyl-bis(perfluoroalkylsulfonyl)imide compound may be soluble in the reaction medium, whereas other acid materials such as sulfonic acids may not be soluble in the reaction medium.

The polymerization reaction may be carried out at ambient temperature or under heating. Generally, heating may be carried out up to about 100° C.; 110° C.; 120° C.; 150° C.; 160° C.; even up to about 180° C. In one embodiment, the reaction is carried out at a temperature of from about 90° C. to about 180° C.; from about 100° C. to about 160° C.; even from about 110° C. to about 150° C. The catalyst may facilitate the reaction at lower or higher temperatures. Here, as elsewhere in the specification and claims, numerical values may be combined to form new and non-disclosed ranges.

The time required for polymerization will depend on the activity of the catalyst in the chosen system and on the desired polymer product. In the absence of moderation, the N-trialkylsilyl-bis(perfluoroalkylsulfonyl)imide catalyst is sufficiently active to convert cyclosiloxanes, e.g., D4, to high molecular weight polysiloxane gums within a few hours.

The starting material for the polymerization reaction is a cyclosiloxane (also known as a cyclic siloxane). Cyclosiloxanes are useful and commercially available materials. They have the general formula $(R^6R^7SiO)_n$, where $R^6$ and $R^7$ are independently chosen from an alkyl, alkenyl, aryl, alkaryl, or aralkyl group having up to 8 carbon atoms, which may be unsubstituted or substituted, and n denotes an integer with a value of from 3 to 12. $R^6$ and $R^7$ may be substituted, e.g., by a halogen such as fluorine or chlorine. The alkyl group may be, e.g., methyl, ethyl, n-propyl, trifluoropropyl, n-butyl, sec-butyl, tert-butyl, or any other appropriate alkyl group. The alkenyl group may be, e.g., vinyl, allyl, propenyl, butenyl, or any other appropriate alkenyl group. The aryl and aralkyl groups may be, e.g., phenyl, tolyl, benzoyl, or any other appropriate aryl and aralkyl groups. In one embodiment, at least 70% of all $R^6$ and $R^7$ groups are methyl or phenyl groups; at least 75% of all $R^6$ and $R^7$ groups are methyl or phenyl groups; at least 80% of all $R^6$ and $R^7$ groups are methyl or phenyl groups; at least 85% of all $R^6$ and $R^7$ groups are methyl or phenyl groups; at least 90% of all $R^6$ and $R^7$ groups are methyl or phenyl groups; even at least 95% of all $R^6$ and $R^7$ groups are methyl or phenyl groups. In one embodiment, substantially all $R^6$ and $R^7$ groups are methyl groups. Here as elsewhere in the specification and claims, numerical values may be combined to form new and non-disclosed ranges. Where $R^6$ and $R^7$ are methyl, the compound is referred to as Dn; e.g., where n is 4, the compound is called D4. The value of n may be from 3 to 6, and in one embodiment, n is 4 or 5. Examples of suitable cyclosiloxanes include, but are not limited to, octamethyl cyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, decamethyl pentacyclosiloxane, cyclopenta (methylvinyl) siloxane, and cyclotetra(phenylmethyl) siloxane. One suitable commercially available material is a mixture of octamethylcyclotetrasiloxane and decamethylcyclopentasiloxane.

In one embodiment, the reaction mixture comprises two or more cyclosiloxanes or silanol terminated poly(dimethylsiloxane). In one embodiment, the reaction mixture comprises a mixture of at least two cyclosiloxanes of different ring sizes. In one embodiment, at least one of the cyclosiloxanes comprises one or more functional groups chosen from hydride, etc.

The reaction mixture is generally purged with inert gas, preferably nitrogen, prior to addition of the catalyst so as to remove any dissolved $CO_2$. Because of the extremely rapid reaction, the reaction mixture is vigorously mixed to ensure homogenous dispersion of the catalyst. Inadequate mixing may result in the catalyst being encapsulated in beads of gum as it is added to the reaction, and the catalyst then takes some time to diffuse out of the gum particles, providing a slower reaction.

The N-trialkylsilyl-bis(perfluoroalkylsulfonyl)imide catalyst may be present in an amount of from about 0.025 weight percent to about 5 weight percent; 0.05 weight percent to about 4 weight percent; 0.1 weight percent to about 3 weight percent; 0.25 weight percent to about 2 weight percent; even from about 0.5 weight percent to about 1 weight percent, based on the weight of the starting cyclosiloxane material. In one embodiment, the N-trialkylsilyl-bis(perfluoroalkylsulfonyl)imide catalyst is present in an amount of from about 0.025 weight percent to about 0.4 weight percent based on the weight of the cyclosiloxane material. Here as elsewhere in the specification and claims, numerical values may be combined to form new and non-disclosed ranges.

The process may further comprise deactivating the catalyst. Deactivating the catalyst may comprise removing the catalyst from the reaction system. The catalyst may also be deactivated by treating with an agent to neutralize the N-trialkylsilyl-bis(perfluoroalkylsulfonyl)imide compound. Suitable bases to neutralize the catalyst include, but are not limited to, bicarbonates (e.g., sodium bicarbonate), ammonium salts, and ion exchange resins (e.g., anionic resins). It will be appreciated that one or more of the above deactivation operations may be employed to deactivate the catalyst. The present catalysts may provide an advantage over other types of catalysts that require filtering the clay particles dispersed in the reaction medium.

Following deactivation, the reaction system may be treated as desired or necessary to remove any color present in the system. Such treatments may include filtering the sample such as through a celite bed, treating with charcoal, etc.

EXAMPLES

Ring Opening Polymerization of Cyclosiloxanes

Ring opening polymerization was performed with a mixture of octamethylcyclotetrasiloxane (D4), alcohol terminated poly(dimethylsiloxane) and hexamethyldisiloxane with N-Trimethylsilylbis(trifluoromethane)sulfonimide as a catalyst. The catalyst as provided at loading ranging from 0.05 weight percent to 1.4 weight percent. All reactions were conducted under nitrogen atmosphere. Comparative examples employed a heterogeneous catalyst. The examples are described below and the results are provided in Table 1.

Example 1

Octamethylcyclotetrasiloxane (20 grams, 0.067 moles), silanol terminated poly(dimethylsiloxane) (80 grams) and hexamethyldisiloxane (0.82 grams, 5.3 mmol) were taken in a round bottom flask fitted with a water cooling condenser. The catalyst N-Trimethylsilylbis(trifluoromethane)sulfonimide (0.025 grams) was added to the mixture. The reaction mixture was kept in an oil bath maintained at 160° C. Samples were taken periodically and the volatile content of the sample was analyzed to monitor the extent of reaction. A volatile content of 34.8% was measured after 1 hour of reaction.

Example 2

Octamethylcyclotetrasiloxane (20 grams, 0.067 moles), silanol terminated poly(dimethylsiloxane) (80 grams) and hexamethyldisiloxane (0.82 grams, 5.3 mmol) were taken in a round bottom flask fitted with a water cooling condenser. The catalyst N-Trimethylsilylbis(trifluoromethane)sulfonimide (0.05 grams) was added to the mixture. The reaction mixture was kept in an oil bath maintained at 160° C. Samples were taken periodically and the volatile content of the sample was recorded to monitor the extent of reaction. A volatile content of 14.1% was analyzed after 1 hour of reaction.

Example 3

Octamethylcyclotetrasiloxane (20 grams, 0.067 moles), silanol terminated poly(dimethylsiloxane) (80 grams), and hexamethyldisiloxane (0.82 grams, 5.3 mmol) were taken in a round bottom flask fitted with a water cooling condenser. The catalyst N-Trimethylsilylbis(trifluoromethane)sulfonimide (0.1 grams) was added to the mixture. The reaction mixture was kept in an oil bath maintained at 160° C. Samples were taken periodically and the volatile content of the sample was recorded to monitor the extent of reaction. A volatile content of 13.7% was measured after 30 min of reaction.

Example 4

Octamethylcyclotetrasiloxane (20 grams, 0.067 moles), silanol terminated poly(dimethylsiloxane) (80 grams), and hexamethyldisiloxane (0.82 grams, 5.3 mmol) were taken in a round bottom flask fitted with a water cooling condenser. The catalyst N-Trimethylsilylbis(trifluoromethane)sulfonimide (0.4 grams) was added to the mixture. The reaction mixture was kept in an oil bath maintained at 160° C. Samples were taken periodically and the volatile content of the sample is analyzed to monitor the extent of reaction. A volatile content of 14.5% was measured after 15 min of reaction.

Comparative Example 1

Octamethylcyclotetrasiloxane (20 grams, 0.067 moles), silanol terminated poly(dimethylsiloxane) (80 grams), and hexamethyldisiloxane (0.82 grams, 5.3 mmol) were taken in a round bottom flask fitted with a water cooling condenser. An acid type catalyst (0.1 g) was used for the reaction. The reaction mixture was kept in an oil bath maintained at 160° C. Samples were taken periodically and the volatile content of the sample was analyzed to monitor the extent of reaction. A volatile content of 13% was measured after 2 hours of reaction.

TABLE 1

Ring opening polymerization of siloxanes.

| Example | Catalyst system | Loading (wt. %) | Temperature (° C.) | Time | % Volatile content |
|---|---|---|---|---|---|
| 1 | N-Trimethylsilyl bis(trifluoromethane) sulfonimide | 0.025 | 160 | 1 hr | 34.8 |
| 2 | N-Trimethylsilyl bis(trifluoromethane) sulfonimide | 0.05 | 160 | 1 hr | 14.1 |
| 3 | N-Trimethylsilyl bis(trifluoromethane) sulfonimide | 0.1 | 160 | 30 min | 13.7 |
| 4 | N-Trimethylsilyl bis(trifluoromethane) sulfonimide | 0.4 | 160 | 15 min | 14.5 |

TABLE 1-continued

Ring opening polymerization of siloxanes.

| Example | Catalyst system | Loading (wt. %) | Temperature (° C.) | Time | % Volatile content |
|---|---|---|---|---|---|
| Comparative Example 1 | Acid type catalyst | 0.1 | 160 | 2 hr | 13.0 |

The results provided in Table 1 indicate that the new acid type catalyst, such as N-trimethylsilyl-bis(trifluoromethanesulfonyl)imide, has an improved activity as compared to the comparative acid and basic type catalysts. With a catalyst concentration of 0.4 weight percent, equilibration was reached in less than 15 min with the new acid type catalyst 1 whereas the equilibration time was two hours and thirty minutes for the comparative catalysts. Apart from faster reaction, the use of N-trimethylsilyl-bis(trifluoromethanesulfonyl)imide as a catalyst is supported by the fact that after polymerization with the comparative acidic catalysts, the particles are finely dispersed in the reaction medium and need to be separated from PDMS. This requires an additional filtration step which, apart from generating solid waste, leads to loss of dimethyl fluids. Due to the solubility of N-trimethylsilyl-bis(trifluoromethanesulfonyl)imide in the reaction system, this additional filtration step may be avoided. The deactivation of the N-trimethylsilyl-bis(trifluoromethanesulfonyl)imide catalyst after polymerization is performed using a base such as sodium bicarbonate. After neutralization of the catalyst, the polymer is passed through a celite bed to remove the neutralized catalyst. Stability tests conducted on the polymer sample after neutralization (heating at 150° C. for 24 hours) suggest no appreciable weight loss, which suggests the removal of the catalyst from the reaction mixture.

Embodiments of the present technology have been described above and modification and alterations may occur to others upon the reading and understanding of this specification. The claims as follows are intended to include all modifications and alterations insofar as they come within the scope of the claims or the equivalent thereof.

What is claimed is:

1. A process for the ring opening polymerization of a cyclosiloxane comprising contacting a cyclosiloxane and a silanol terminated siloxane with a N-trialkylsilyl-bis(perfluoroalkylsulfonyl)imide compound.

2. The process of claim 1, wherein the N-trialkylsilyl-bis(perfluoroalkylsulfonyl)imide is of the formula:

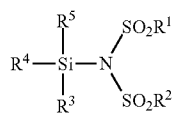

where $R^1$ and $R^2$ are independently chosen from a perfluoroalkyl radical; and $R^3$, $R^4$, and $R^5$ are independently chosen from, a linear or branched alkyl a linear or branched alkyl optionally comprising one or more heteroatoms.

3. The process of claim 2, wherein the perfluoroalkyl radical is a linear or branched perfluoroalkyl radical having 1-10 carbon atoms.

4. The process of claim 2, wherein the perfluoroalkyl radical is chosen from —$CF_3$, —$C_2F_5$, —$C_3F_7$, —$C_4F_9$, —$C_5F_{11}$, —$C_6F_{13}$, —$C_7F_{15}$, —$C_8F_{17}$ or a combination of two or more thereof.

5. The process of any one of claim 2-4, wherein the alkyl group is chosen from a linear or branched alkyl having 1-10 carbon atoms.

6. The process of claim 2, wherein $R^1$ and $R^2$ are each —$CF_3$, and $R^3$-$R^5$ are each $CH_3$.

7. The process of claim 1, wherein the N-trialkylsilyl-bis(perfluoroalkylsulfonyl)imide is present in an amount of from about 0.025 weight percent to about 5 weight percent based on the total weight of the cyclosiloxane.

8. The process of claim 1, wherein the N-trialkylsilyl-bis(perfluoroalkylsulfonyl)imide is present in an amount of from about 0.1 weight percent to about 0.4 weight percent based on the total weight of the cyclosiloxane.

9. The process of claim 1, wherein the cyclosiloxane is of the formula $(R^6R^7SiO)_n$, wherein $R^6$ and $R^7$ are independently chosen from hydrogen or an optionally substituted alkyl, alkenyl, aryl, alkaryl or aralkyl group having up to 8 carbon atoms, and n denotes an integer with a value of from 3 to 12.

10. The process of claim 1, wherein the cyclosiloxane is chosen from octamethyl cyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, decamethyl pentacyclosiloxane, cyclopenta (methylvinyl) siloxane, cyclotetra(phenylmethyl) siloxane, cyclopenta methylhydrosiloxane, or a combination of two or more thereof.

11. The process of claim 1 comprising two or more cyclosiloxanes, where at least two cyclosiloxanes have a different ring size from each other.

12. The process of claim 1, wherein the reaction comprises an endblocker material.

13. The process of claim 12, wherein the endblocker material is chosen from hexamethyl di siloxane; octamethyltrisiloxane; decamethyltetrasiloxane; dodecamethylpentasiloxane; tetradecamethylhexasiloxane; hexadecamethylheptasiloxane, hydride substituted siloxane or a combination of two or more thereof.

14. The process of claim 1 further comprising deactivating the catalyst.

15. The process of claim 14, wherein deactivating the catalyst comprises: treating the product with a material to neutralize the catalyst such as a base or a basic resin, or a combination of two or more thereof.

16. The process of claim 14 further comprising filtering the reaction mixture.

17. The process of claim 1, wherein the silanol terminated siloxane is silanol terminated poly(dimethylsiloxane).

* * * * *